E. B. MOSELEY.
FILING APPLIANCE.
APPLICATION FILED NOV. 7, 1910. RENEWED DEC. 2, 1912.

1,142,115.

Patented June 8, 1915.
3 SHEETS—SHEET 1.

WITNESSES:
J. H. Gardner.
K. R. Woddell.

INVENTOR:
Emerson B. Moseley,
BY
E. T. Silvius,
ATTORNEY.

E. B. MOSELEY.
FILING APPLIANCE.
APPLICATION FILED NOV. 7, 1910. RENEWED DEC. 2, 1912.
1,142,115.
Patented June 8, 1915.
3 SHEETS—SHEET 2.
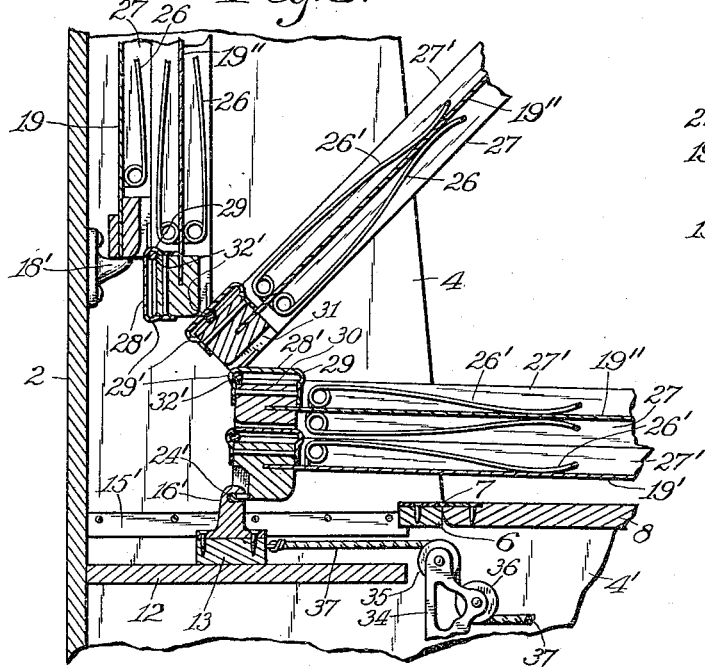
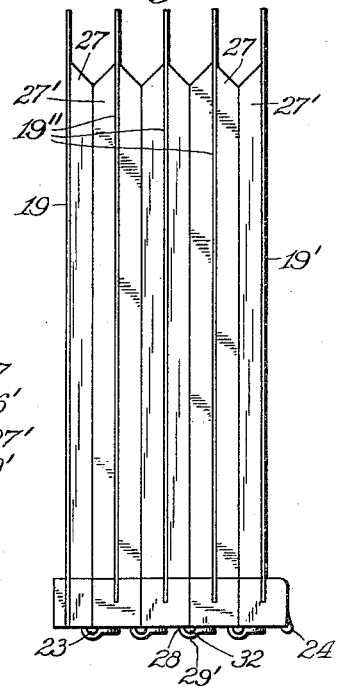
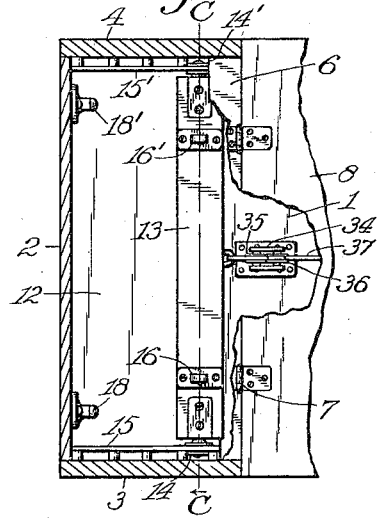
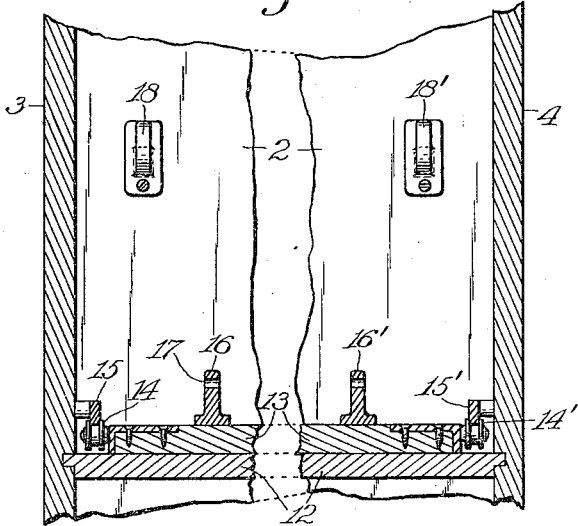
WITNESSES:
J. H. Gardner.
K. R. Woddell.
INVENTOR:
Emerson B. Moseley,
BY
E. T. Silvius,
ATTORNEY.

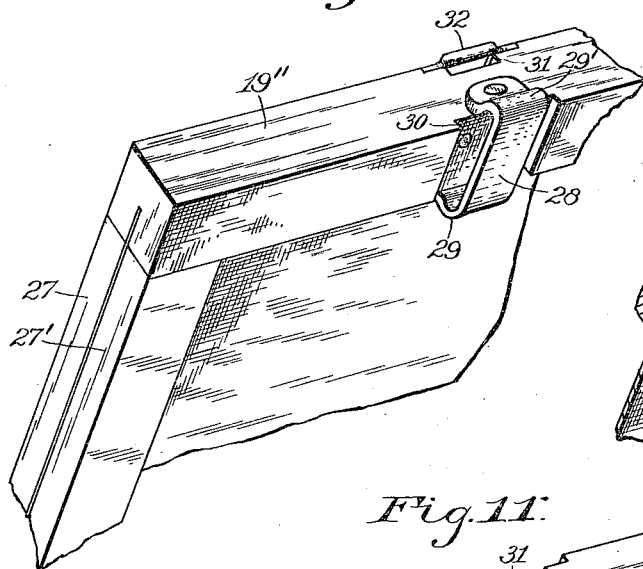
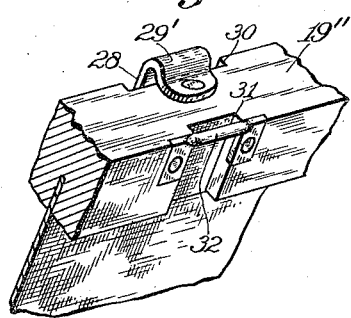
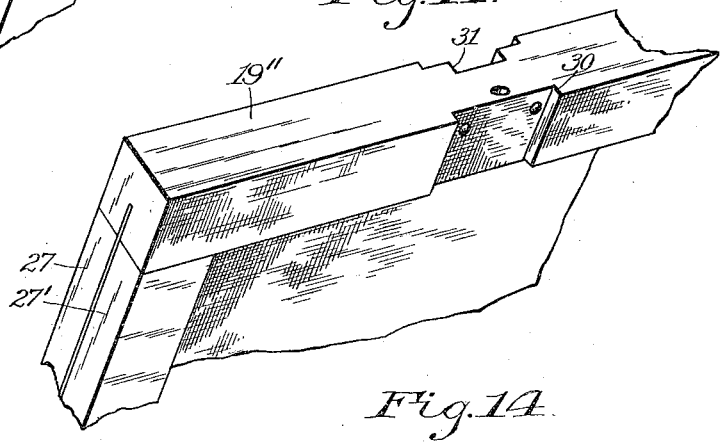
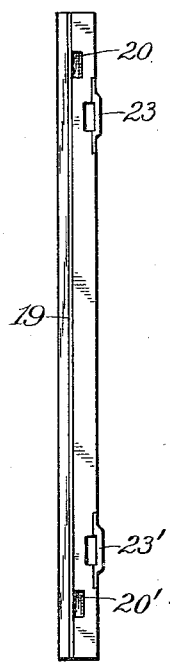
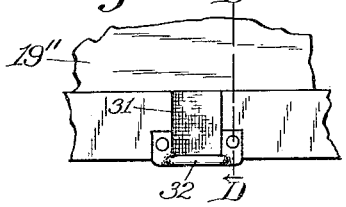
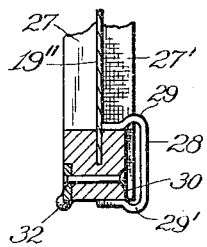

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,142,115.   Specification of Letters Patent.   Patented June 8, 1915.

Application filed November 7, 1910, Serial No. 590,998. Renewed December 2, 1912. Serial No. 734,627.

*To all whom it may concern:*

Be it known that I, EMERSON B. MOSELEY, a citizen of the United States, residing at Alliance, in the county of Stark and State of Ohio, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to appliances for filing papers for future reference, more particularly duplicate bills used in credit accounting systems, the invention having reference particularly to bill holding leaves or frames and means for connecting them together and to a supporting case or stand, to constitute a filing cabinet or credit register.

The object of the invention is to provide improved means for connecting leaves together so that they may be mounted normally in upright position in echelon and be moved forward to prone position, and to lie in a rectangular pack, a further object being to simplify and improve the construction of filing appliances of the above-mentioned character.

With the above-mentioned and minor objects in view, the invention comprises a plurality of improved leaves or frames adapted to hold bill slips or papers thereon, and novel devices for connecting the normal lower ends of the leaves together so that they may move pivotally and also longitudinally one to another; the invention consisting further in the novel parts, and combinations and arrangements of parts, as hereinafter particularly described and claimed.

Figure 1:
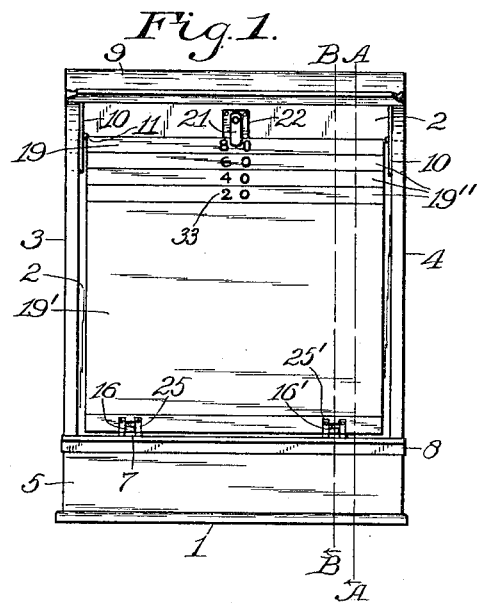
Figure 2:
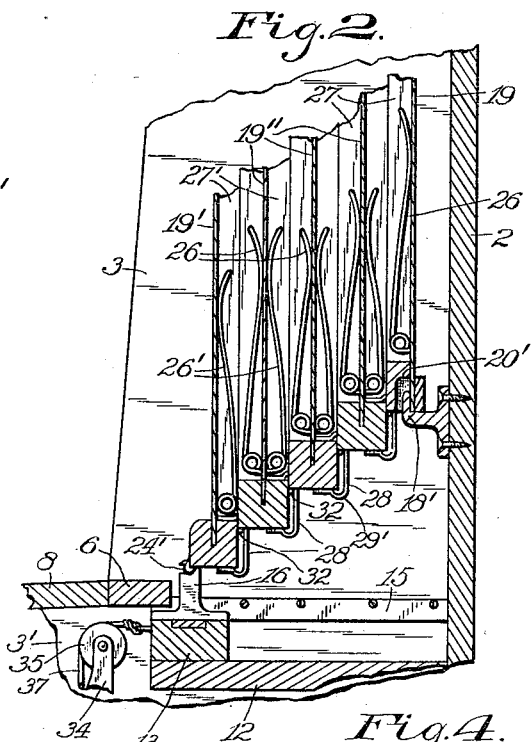
Figure 3:
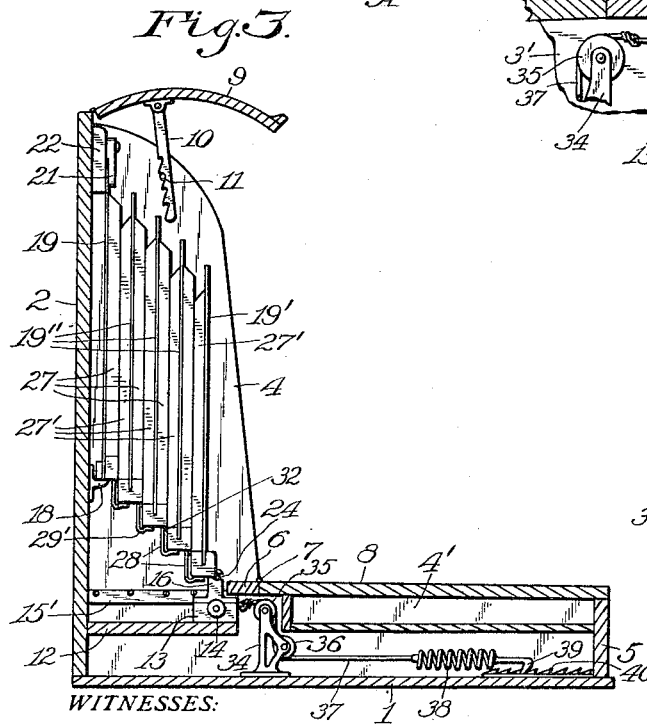
Figure 4:
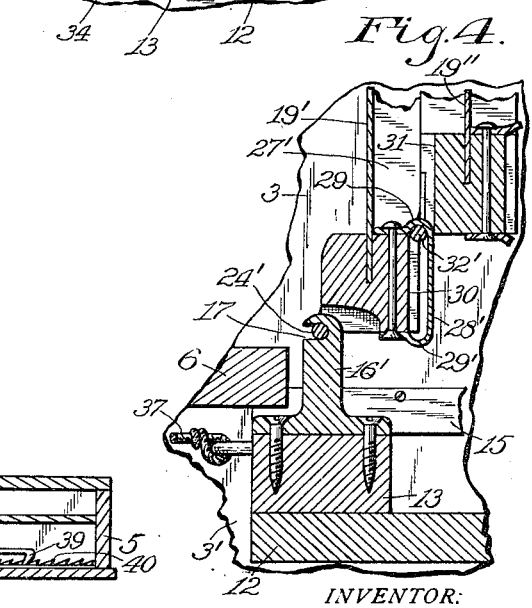

Referring to the drawings, Figure 1 is a front elevation of a filing case in which the improved filing appliances are mounted; Fig. 2, a fragmentary section on the line A A in Fig. 1; Fig. 3, a sectional elevation on the plane at the inner side of the left hand side of the filing case; Fig. 4, a fragmentary section on the line B B in Fig. 1; Fig. 5, a fragmentary section also on the line B B in Fig. 1 looking toward the right hand side; Fig. 6, an elevation of the filing leaves grouped in a rectangular pack for insertion into a fire proof safe for preservation; Fig. 7, a horizontal section of the filing case without the leaves; Fig. 8, a fragmentary vertical section of the case approximately on the line C C in Fig. 7; Fig. 9, a fragmentary perspective view of one of the intermediate leaves; Fig. 10, a fragmentary perspective view showing the opposite side of the intermediate leaf; Fig. 11, a fragmentary perspective view of the intermediate leaf minus the hinging connections; Fig. 12, a bottom plan of the rearmost one of the leaves; Fig. 13, a fragmentary elevation of one of the intermediate leaves; and Fig. 14, a vertical section on the line D D in Fig. 13.

Similar reference characters in the different figures of the drawings indicate like parts or features of construction herein referred to.

A practical embodiment of the invention comprises a suitable case in which the leaves are mounted, preferably so as to be removable, and the case may suitably include a bottom 1, a relatively high back 2 and sides 3 and 4 on the rearward portion of the bottom, relatively low sides 3' and 4' extending from the higher sides forward to a front 5 on the forward end of the bottom. A top rail 6 preferably extends between the sides 3, 4, at a suitable distance above the bottom 1, and preferably has hinges 7 thereon to which a front door 8 is connected so as to either stand up against the higher sides 3, 4, or lie upon the lower sides 3', 4'. The case preferably has a lid 9 hinged thereon provided with props 10 adapted to be supported on projections 11 that are secured to the upper portions of the sides 3 and 4, the arrangement being such that when the door 8 is standing uprightly the lid 9 may be lowered down to the door. A horizontal base plate or board 12 is arranged in the case a suitable distance above the bottom 1 and extends forwardly from the back 2. The base plate 12 supports a suitable cross-head 13 provided with guide-rollers 14 and 14' on its ends. A pair of guide-rails 15 and 15' are secured approximately horizontally to the sides of the case above the base-plate or board 12, so that the guide-rollers may run against the under sides thereof. The cross-head is provided on its upper side with a pair of pivot bearings 16 and 16' having each a slot 17 in its forward side into which a pivot may be removably inserted. The back 2 of the case has a pair of hook-like leaf-supports 18 and 18′ thereon at a suitable distance above the plane of the base plate or board 12 on which to hang a group of leaves. A cabinet case of the above-mentioned character being commonly used requires no further description and may be variously modified in detail.

A suitable number of bill holding leaves or frames are provided and suitably assembled, there being a rear leaf 19, a front leaf 19′, and a suitable number of intermediate leaves 19″, all the intermediate leaves being alike in structure. The leaves are designed to normally stand upright in echelon or stepped relation each to the other in the case, and the normally lower ends of the leaves are suitably thickened and strengthened, the body portions of the leaves being composed of thin sheet material, preferably metallic. The lower end of the rear leaf 19 has two recesses 20 and 20′ therein to receive the hook-like supports 18 and 18′, respectively, that normally support the rear leaf which is held in normal upright position by a suitable device, such as a button 21 mounted on a base 22 secured to the upper portion of the back 2. The lower forward portion of the rear leaf is provided with two pivots 23 and 23′ to which the adjacent forward intermediate leaf is connected, as will be further described.

The lower forward side of the front leaf 19′ is provided with a pair of pivots 24 and 24′ that are normally connected to the pivot bearings 16 and 16′, respectively, the pivots preferably being connected to the leaf by means of securing plates 25 and 25′, respectively. The rear leaf and intermediate leaves each have a suitable number of spring clamps 26 and frame strips 27 on their forward sides, and the front leaf and the intermediate leaves have also similar spring clamps 26′ and frame strips 27′ on their backs or rearward sides, the frame strips being suitably disposed relatively to the spring clamps, as is customary.

The front leaf and each intermediate leaf is suitably provided with a plurality of guideways at the normally lower rear portions thereof that extend substantially vertically or longitudinally of the leaves, the guideways preferably being formed by means of guide-bars 28 and 28′, each guide-bar having curved arms 29 and 29′ on opposite ends thereof that are secured to the thickened portion of the leaf and serve as pivot bearings, the leaf preferably having a recess 30 behind each guide-bar to constitute a portion of the guideway. The lower forward side of the rear leaf and each one of the intermediate leaves has recesses 31 therein to clear the guide-bars of the adjacent leaves, and pivots 32 and 32′ are rigidly fixed opposite the lower ends of the recesses 31 and are embraced by the guide-bars of the adjacent leaves, so that the pivots may be moved from the pivot bearings 29 to the pivot bearings 29′ and operate pivotally in contact with either one of the pivot bearings, the arrangement being such that when the pivots are in contact with the pivot bearings 29 the forward leaves are supported pivotally by the adjacent rearward leaves, and when the pivots are in contact with the pivot bearings 29′ the leaves are arranged in a rectangular pack in prone position or may stand uprightly when removed from the case, as in Fig. 6, with the normally lower ends thereof on a common plane. The forward sides of the intermediate leaves and the rear leaf have index characters 33 on the upper portions thereof, as is customary, so as to be in plain view when the leaves are in normal position.

The leaves may be maintained in upright position by various means, preferably a stand 34 being secured upon the bottom 1 of the case forward of the base-plate or board 12 and provided with guide sheaves 35 and 36, a cord 37 being connected to the cross-head 13 and extending over the guide-sheave 35 and downward under the guide-sheave 36, the cord being connected to a spring 38 which is provided with a hook 39 adapted to be hooked onto any one of a number of teeth 40 mounted on the bottom 1, for adjusting the tension of the spring.

In practical use, papers or duplicate bill slips are placed in systematic order on the leaves and secured thereto by the spring clamps 26, 26′, or otherwise as may be desired. When it is desired to gain access to any one of the leaves, the desired leaf or one in front of it together with all the leaves forward of it may be moved forward to prone position by hand, the operator taking hold of the upper end of the rearmost leaf that is to be brought forward, and when pulling the leaves forward the front leaf forces the cross-head 13 rearward as the leaf moves forward pivotally thereon, and the rearmost one of the leaves being moved forward moves relatively to the adjacent normally positioned leaf until the pivots of the latter have contact with the lower pivot-bearings 29′ and cause the pivots of the moving leaves to move to said pivot bearings, so that each leaf in turn moves so as to bring the leaves into the form of a rectangular pack when in prone position. When the leaves are lifted and moved upward on their pivots from prone position the action of the spring 38 forces the cross-head 13 forward so as to assist in returning the leaves to normal position, and then normally holds them uprightly.

Having thus described the invention, what is claimed as new, is—

1. A filing appliance including a plurality of assembled leaves having each a plurality of guideways with end bearings at one side and a plurality of pivots on the opposite side thereof, the pivots being mounted in the guideways of adjacent leaves and thereby normally supporting the forward leaves in echelon, the leaves being movable relatively each to the other to form a rectangular pack.

2. In a filing appliance, a plurality of leaves having recesses in opposite sides thereof, guide-bars arranged opposite the recesses on one side of the leaves and having each a pair of opposing arms serving as pivot-bearings and secured to the leaf, and pivots on the opposite side of the leaves extending across the lower end portions of the recesses therein, the pivots that are on each leaf being arranged behind the guide-bars and movable partially in the adjacent recesses of the adjacent leaves.

3. In a filing appliance, a plurality of normally upright filing leaves having each a pivot on one side of the lower portion thereof and having also a bearing on the opposite side above the lower end thereof normally resting upon the pivot of an adjacent one of the leaves, and means for freely guiding the pivot of one leaf from normal position to the lower end of the nearer side of the adjacent leaf and permitting relative pivotal movement of the two leaves.

4. In a filing appliance, the combination with a plurality of normally upright filing leaves arranged face to face, one side of the lower portion of each leaf having a pivot, of means fixedly arranged on the opposite side of each leaf normally bearing upon the pivot of the next adjacent leaf and freely guiding the pivot to or from a position at the lower end or to or from a position distant from the lower end of the side of the leaf that faces the adjacent leaf, said means permitting pivotal movement of the leaves relatively each to the other at all relative positions of the pivot.

5. In a filing device, the combination with a plurality of filing leaves arranged face to face and normally in upright position, each one of the leaves having pivots on the forward portion of the lower end thereof, the rearward portion of the lower end of the rearmost one of the leaves being suitably supported, of guiding means fixedly arranged on the rearward side of the remaining leaves normally bearing upon and slidingly connecting the leaves with the pivots of the next adjacent leaves for enabling free shifting of the leaves longitudinally in close arrangement relatively each to the other and also permitting relative pivotal movement of the leaves.

6. A filing appliance including a plurality of assembled leaves, each having a plurality of guideways with end bearings at one side and a plurality of pivots on the opposite sides thereof, the pivots being mounted in the guideways of adjacent leaves for normally supporting the forward leaves in echelon, a fixed pivotal bearing for one end leaf, and a horizontally yielding pivotal bearing for the other end leaf, whereby the leaves may be swung forward and reclined in a rectangular pack.

In testimony whereof, I affix my signature in presence of two witnesses.

EMERSON B. MOSELEY.

Witnesses:
 HENRY F. POLLOCK,
 MARY M. AULD.

Copies of this patent may be obtained for five cents each, by addressing the "Commissioner of Patents, Washington, D. C."